Figure 1:
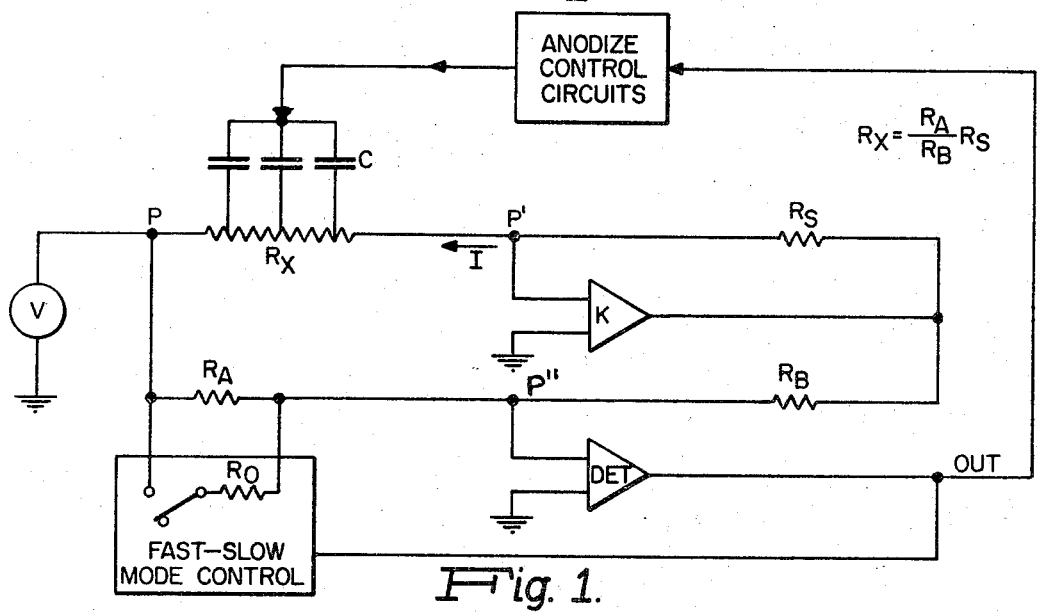

United States Patent [19]
Holtje

[11] 3,855,109
[45] Dec. 17, 1974

[54] APPARATUS FOR HIGH SPEED RESISTOR TRIMMING

[75] Inventor: Malcolm C. Holtje, Concord, Mass.

[73] Assignee: General Radio Company, Concord, Mass.

[22] Filed: Apr. 9, 1973

[21] Appl. No.: 349,061

[52] U.S. Cl. .............................................. 204/228
[51] Int. Cl. ............................................. B01k 3/00
[58] Field of Search ........... 204/228, 228 A; 29/610

[56] References Cited
UNITED STATES PATENTS

| | | | |
|---|---|---|---|
| 3,282,821 | 11/1966 | Cistola | 204/228 |
| 3,562,133 | 2/1971 | Ward | 204/228 |
| 3,567,616 | 3/1971 | Crisman et al. | 204/228 |
| 3,577,335 | 5/1971 | Blitchington, Jr. | 204/228 |

Primary Examiner—John H. Mack
Assistant Examiner—D. R. Valentine
Attorney, Agent, or Firm—Rines and Rines; Shapiro and Shapiro

[57] ABSTRACT

This disclosure deals with a novel technique for trimming thin film resistors and the like by continually determining during relatively rapid anodizing whether the resistor has obtained a value greater than or less than a desired value without actually determining the resistance value, and when the desired value is closely approached, more accurately making the determination while anodizing the resistor more slowly to the desired value.

9 Claims, 12 Drawing Figures

APPARATUS FOR HIGH SPEED RESISTOR TRIMMING

The present invention relates to methods of and apparatus for the thin film anodizing of resistors and the like, as of tantalum nitride and similar materials.

As described, for example, in U.S. Pat. No. 3,148,129 to H. Basseches et al., metal film resistors may be formed by depositing upon dielectric substrates thin layers of film-forming metal (such as tantalum, titanium, zirconium, hafnium, aluminum and niobium), and electrolytically anodizing the same to form oxide layers which, by reducing the resistor film thickness, produce a desired resistance value. Such techniques have involved simultaneously anodizing the resistor and measuring its value, until the desired value is hopefully attained, after which anodizing is terminated. With anodizing and measuring thus carried on simultaneously, however, the anodizing interferes with the measuring, precluding accurate measurements.

It has thus been proposed alternately to connect the resistor to an anodizing current source and then to a bridge measuring circuit for measuring the resistance value. This process is continued until the resistor reaches value. There are, however, at least four basic problems with such operations. First, to determine the resistance value accurately takes significant time in view of the speed limitations of automatic bridges. Secondly, to adjust a resistor accurately requires that the adjustment between measurement cycles be small, thus inherently requiring many measurements to be made. Thirdly, high speed switching of the resistor from the anodizing current source to the bridge measuring circuit causes problems of thermal and tribo-emf generation, contact resistance, and reliability. And fourthly, the large capacitance formed by the electrolyte gel on the resistor separated by, for example, the $Ta_2O_5$ dielectric layer in the case of tantalum resistors, requires a long discharge time after each anodizing cycle before accurate measurements can be made.

To try to obviate the second problem, above, it has been proposed to reduce the number of required measurements by using a digital bridge to make accurate resistance measurements and a digital computer to measure the rate of change of resistance with anodizing, thus to predict how far to proceed. Similar techniques are described, for example, in an article by D. H. Raymond, entitled "Computer-Directed Anodization and Testing of Precision Thin Film Resistor Circuits," p. 3 et seq. of The Western Electric Engineer, 1971; and in an article by A. R. Gerhard and L. P. Perdick, entitled "Computerized Testing of Thin Film Circuit Conductors," appearing commencing with p. 16. While this technique at least partially obviates the requirement for many measurements to reach final value, because of vagaries in the anodizing process, such as film defects, the predictions are not perfect and many high-accuracy measurements are still required to produce high-accuracy resistors. The other three above-mentioned problems, moreover, still remain.

An object of the present invention, thus, is to provide a new and improved method of and apparatus for such resistor anodizing that shall not be subject to any of the before-mentioned disadvantages. Underlying the invention is the discovery that, to anodize a resistor to value, does not require the actual determination of the resistor value at each step of the process. One merely has to determine if the resistor is greater than or less than the desired value. Since, indeed, a theoretically optimum 0.01 percent bridge must make at least fourteen of these comparisons to "measure value," a single comparison can be made at least fourteen times faster than one can determine the actual resistor value. Such a comparison approach can easily be done in one microsecond. Though making a large number of measurements is not a problem per se, it is the existence of the first, third and fourth before-recounted problems which renders the necessity for a large number of measurements, a problem.

The required high-speed switching between measurement and anodizing is, of course, a limiting problem itself. The best solution to high-speed bridge switching, however, is to obviate the necessity to switch in the measurement bridge; and the present invention achieves this end through permanent measurement connections, as later explained. Since the capacitance between the electrolyte and the resistor that is being adjusted cannot be eliminated, it sets an ultimate limit on processing speeds. If a circuit is employed wherein the charging and discharging voltage transients have the proper sign with respect to the bridge unbalance voltage, however, it has been determined that one can in fact anodize and compare without waiting for these transients to decay completely, except on the last measurements. The circuits of the present invention accomplish this improved operation simply and automatically. In addition, fast charge and discharge circuits are provided to charge and discharge this capacitance as rapidly as possible.

A further object of the invention is to provide a novel resistance anodizing method and apparatus of more general utility, also. In summary, from one of its aspects, the invention contemplates a method of trim-anodizing a thin film resistor to a predetermined value, that comprises, alternately applying anodizing current to said resistor and measuring whether the value of said resistor is greater or less than the predetermined value in a relatively rapid trimming cyclical manner, such cycle being principally anodizing and to a minor extent settling and measuring; and, when said resistor value approaches close to said predetermined value, modifying such cycle to provide a relatively slow trim with the cycle being principally settling and measuring and to a minor extent anodizing, in order to avoid overshooting the resistance value.

Other and further objects will be explained hereinafter and are more particularly delineated in the appended claims.

The invention will now be described with reference to the accompanying drawings, FIG. 1 of which is an elementary schematic circuit diagram of a bridge circuit for carrying out the novel method underlying the invention;

FIGS. 2, 3, 5 and 6 are similar views of modifications, the latter being particularly adapted for computer control; and FIGS. 4a through g are explanatory waveforms.

Referring to FIG. 1, the unknown value resistor-to-be-anodized $R_X$ is shown connected between a grounded voltage source V of, say, approximately −1 volt at P, and a virtual ground established at P' by an operational amplifier K, connected to produce feedback across the standard or reference resistance $R_s$. The ratio arms $R_A$ and $R_B$ are connected at P'' to the detector DET. The operational amplifier may be constituted of, for example, low-input-current FET devices in the input, providing a gain of over 100,000. Thus, the currents through the standard resistor $R_S$ and the unknown resistor $R_X$ are substantially identical and the detector will have zero output when $R_x = R_A R_S/R_B$.

Since, in accordance with the invention, the anodizing is to take place in two modes, a rapid or fast mode and a slow mode, the bridge has to be offset (as, for example, with an offset resistor $R_o$) so that it may first locate the point at which the fast and slow mode interchange is to be made. Anodizing commences in the fast or rapid mode, and is shown as effected by later-described anodized control circuit, controlled by the output of the detector DET, to apply anodizing current to the resistor $R_X$ through capacitance C distributed therealong. The fast-slow mode schematically shown control on the bridge circuit, so-labelled, alters the ratio arm $R_A$ so that the bridge reaches balance prematurely. As this first balance is reached, the control circuits automatically move the fast-slow mode control switch to the slow position, re-establishing the ratio arm at the proper value $R_A$, and the anodizing again proceeds until the bridge reaches balance a second time, which is now the true balance at the point at which anodizing is to be stopped. A suitable fast-slow mode control circuit is later described in connection with the embodiment of FIG. 5.

A typical value for the offset in the bridge caused by this fast-slow mode control is 2 percent in manual bridges; and, in the computer control versions, this value can be programmed to whatever is optimum. The purpose of the bridge circuit is primarily to control the anodized control circuit to bring the resistor to a desired value, and the bridge measures the resistor by determining whether it is greater or less than the standard resistor times the ratio of the ratio arms, providing an output signal which automatically turns on or off the anodize control circuits to render the same effective or ineffective until the resistor $R_X$ is brought to the proper value. The anodize control circuits are shown in detail in FIG. 5, also.

The voltage across the unknown resistor $R_x$ may be one volt on all bridge ranges, and the voltage source V is current limited at, for example, 100 ma. This provides complete protection against inadvertent short circuits. In fact, the bridge will operate at any resistance below a typical rated 10-ohm lower limit with a reduced accuracy of approximately $0.03\% \cdot 10/R_x$.

Figure 2:
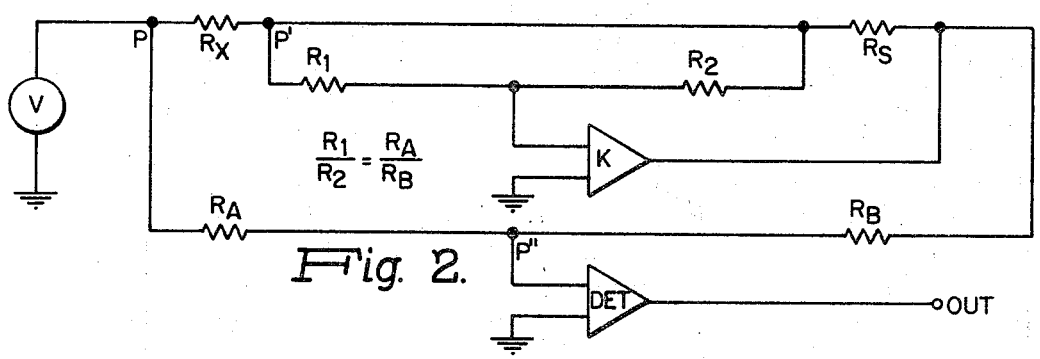

To reduce lead connection problems, the bridge may preferably be constructed completely four-terminal at both the standard and unknown resistors $R_s$ and $R_x$, as shown in FIG. 2, such as at P and P' in connection with $R_x$. This is effected with the aid of supplemental resistors $R_1$ and $R_2$, wherein $R_1/R_2 = R_A/R_B$. Since these resistors can be manufactured with low values and the connections may have significant resistance, this is an important consideration. The high-impedance ratio arms $R_A$ and $R_B$ are maintained two-terminal, however, since the connections are fixed within the bridge and are truly negligible.

Figure 3:
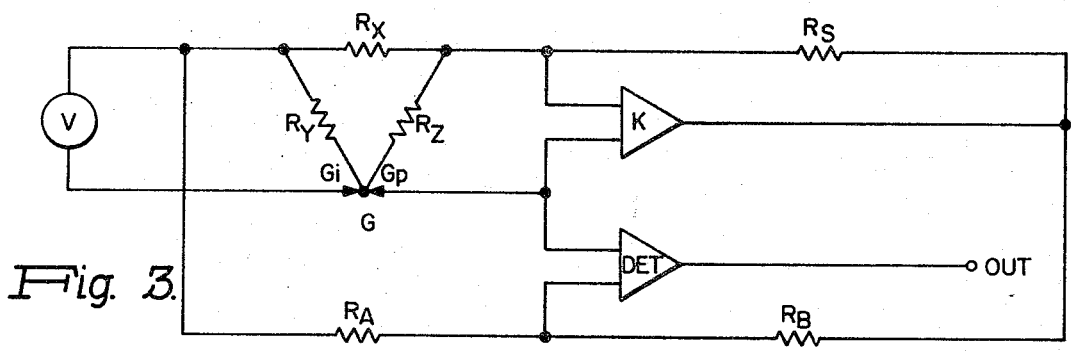

A two-terminal guard refinement is shown in FIG. 3. For simplicity, and in order not to confuse the drawing, the four-terminal unknown and standard resistor connections of FIG. 2 (P, P', etc.) have been eliminated from the figure, but are preferably employed in practice. The shunting resistor $R_y$ which is effectively across the source of voltage V does not affect the bridge at all, and values as low as 10 ohms may be guarded before the source reaches its current limit. The errors caused by IR drops in the guard connection are eliminated by the second (potential) guard lead path $R_z$. Undesired resistance from the other unknown-resistor terminal is effectively connected across the detector DET, and its effect here is to reduce gain. Adequate sensitivity can be maintained for resistors at least as small as the unknown resistor $R_x$.

The shunting resistances $R_y$ and $R_z$ are effectively eliminated from the measurement by bringing their mid-point to a guard-point G, with the lower terminal of the voltage source V being connected to this guard point at a terminal labelled $G_i$ which is the current lead through which the bridge currents are flowing. To eliminate the effects of resistance in this connection, a two-terminal guard point is used, similarly to the two-terminal connections P-P' on the unknown resistor $R_x$ of FIG. 2, and those on the standard resistor $R_s$. The point laballed $G_p$ senses the actual potential that results at the junction of $R_y$ and $R_z$, with the detector output and the operational amplifier K being referenced to this potential.

To insure accuracy and provide the best possible failure rates, no switching whatsoever is done in the bridge circuit of the invention while a resistor is being brought to value. Once a resistor is selected, the bridge stays connected, maintaining both ends of the resistor within one volt of ground, during anodizing. Protective back-to-back limiting diodes, not shown, may be connected to the unknown resistor $R_x$ at the detector DET to keep the resistor within 1 volt of ground even if the capabilities of the operational amplifier K are exceeded.

Anodizing is accomplished in several distinct modes in accordance with the invention. First, the resistor $R_x$ is anodized to a specified minimum oxide voltage rating between zero and, for example, 100 volts. Secondly, it is alternately anodized and measured at high speed until it is near final value. And, thirdly, it is thereafter anodized at a reduced rate to final value.

The first mode is controlled be setting the desired pre-trim-anodize voltage, later discussed in connection with FIG. 5, and with the voltage limit detector measuring the voltage and controlling the current source. Setting this to zero effectively eliminates this mode.

In the fast-trim mode, typically 80 percent of the time is spent anodizing and 20 percent is spent settling as later shown in connection with the waveforms of FIG. 4. The settling time is necessary because of the presence of the large capacitance C, FIGS. 1 and 5, caused by the gel electrolyte on the resistor $R_x$. When far from the desired value, however, wasting time for settling so that very accurate measurements can be made is not necessary so long as the resulting error is always in a direction such that overshooting the desired value can never occur. Thus, a fast trim cycle is achieved, with anodizing occupying four times the time of settling as the principal function during the cycle, and measurement occurring in a minor period of time.

While the capacitance C between the electrolyte and the resistor $R_x$ is shown as lumped between the anodizing probe arrow and the ends of the resistor $R_x$, it is actually distributed along the surface of the resistor. The anodize probe is discharged quickly with electronic circuits so that the anodize probe voltage waveforms are approximately as shown in FIG. 4.

As the final resistance value is approached, the cycle switches to provide a longer settling time for more accurate measurements, with the anodizing slowing down 4-to-1 since the current is on for, say, only 20 percent of the cycle rather than 80 percent, and with settling occupying the principal period and anodizing a minor portion of the cycle.

If a measurement rate is chosen which does not allow adequate settling time, the system will skip alternate cycles (or more, if necessary) to extend the settling time automatically. Normally, optimum processing speed results when the measurement rate is set so that this "counting down" occurs only for the last few cycles.

At low anodizing currents, the gel capacitance also limits the minimum anodizing time which can be used. With a constant-current anodizing source I, the capacitance requires a time, $T = CE/I$, to charge to the anodizing voltage. If this is longer than the available time, no anodizing would occur. To reduce this problem, a circuit, as later described in connection with the embodiment of FIG. 5, may be provided to remember the voltage of the previous anodizing cycle and to charge the gel capacitance to this voltage as full (say 10 ma) current and then to reduce the current to the selected anodize current. To avoid the problems of overshooting the desired resistance value which this as well as other voltage-rate-of-rise anodize methods can generate, an adjustment is provided to reduce the fast-charge voltage to a value sufficiently below the stored value so that overshoot is negligible.

Selection of the optimum measurement rate is not always easy. For best accuracy, the fastest rate should be chosen. This also permits the highest anodizing current for a given accuracy and, therefore, the fastest processing speed. If the settling time requirement is not met, however, the processing speed will be reduced far more than will be the case if a slower more adequate measuring rate is set.

As the final measurements are made, a long settling time is required when trimming large resistors, since the distributed capacitance C to the gel may be charged to over 200 volts and full bridge accuracy requires measurements to 1 nanoampere at 100 $k\Omega$. The distributed nature of the capacitance further aggravates the problem. In general, for tantalum nitride resistors the optimum measuring rate is approximately given by:

$$MR = 5000 \cdot \Omega/\square /w^2 \cdot R^2$$

where, $w$ is resistor width in mils R(i.e., in $K\Omega$), and $\Omega/\square$ is resistivity of the film.

Thus for a 10 $K\Omega$ resistor 5 mils wide in 50 $\Omega/\square$ material, the optimum measurement rate would be 100/sec.

Figure 4:
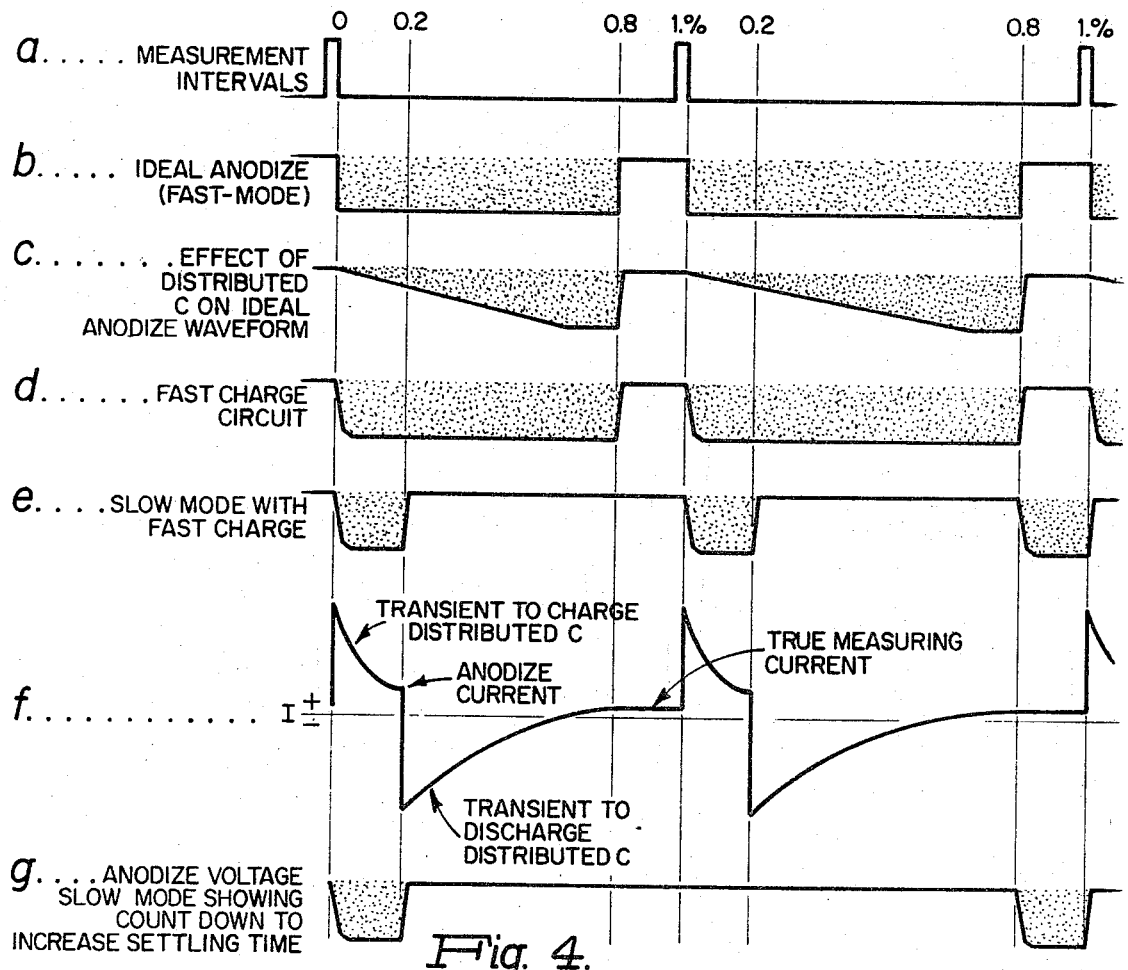

FIG. 4 illustrates some of the basic operational waveforms within the instrument, including hereinafter described details in the more complete circuit of FIG. 5. The waveform labelled FIG. 4a shows the basic time frame and the intervals at which the measurement is actually made, each cycle extending from zero through one. Critical or signigicant points in the cycle, later referenced, are at 0.2 and 0.8 of the cycle, with the measurement being made just before any cycle starts. The waveform at FIG. 4b is an ideal anodize voltage waveform showing that the anodizing will start at the end of the measurement period, assuming the bridge has indicated that the resistor $R_x$ is not yet at final value. In this example, the anodize current flows for 80 percent of the cycle and then shuts down for the last 20 percent to enable the stray capacitance C which is charged across the resistor $R_x$ to discharge, and the measurement determination of the bridge to occur in the last part of the cycle. In accordance with the invention, the bridge is connected to the unknown resistor $R_x$ all the time so that it is effectively always measuring the resistor. The output from the bridge, however, is used to control the anodizing, FIG. 1, only during the measurement interval shown in waveform FIG. 4a, above.

Since there is the capacitance C distributed along the resistor $R_x$, the ideal waveform shown in FIG. 4b does not actually exist; the operational waveform being more like that shown in FIG. 4c. Since there is a constant-current source in the anodize control circuit charging this capacitance, the voltage rises linearly. It is possible, however, for the capacitance to be so high that the anodize waveform will not even reach a level where anodizing can occur. Anodizing, in general, does not occur to any significant extent until the voltage reaches the level of the previous cycle. If the voltage is much below this, the rate at which anodizing occurs is so slow that it can be considered to be non-existent. In the waveform of FIG. 4c, accordingly, the anodize current is on for 80 percent of the time, but anodizing occurs for only a very short portion at the very end where it reaches its maximum value. If the capacitance C were slightly higher, indeed, no anodizing would occur unless the rates were slowed down drastically. To circumvent this problem, special fast charge circuits are provided, later discussed in connection with FIG. 5, which sense and store the value of voltage from the previous anodizing cycle and then rapidly charge the distributed capacitance C up to this value.

As a result, the waveform of FIG. 4d is provided, wherein the anodize waveform is rapidly brought almost to the level of the previous cycle by such a fast charge circuit. The anodize current, later described in the embodiment of FIG. 5, then takes over and brings the voltage up to the final value, just missing corner in the waveform, and then anodizes for almost the full 80 percent, being very close to the ideal waveform of FIG. 4b. This mode of anodizing progresses until the bridge circuit, now set in this fast mode, indicates balance. At this point, the timing shifts and the slow mode takes over. The offset resistor $R_o$ is disconnected so that the bridge is in its true measurement state. With this switching to the true bridge balance condition and shifting to the slow mode, anodizing occurs for 20 percent of the cycle, and the settling is now stretched to 80 percent. In this mode, two things happen. First of all, the settling time is increased so that there is a more accurate determination of the resistor value $R_x$; and secondly, the anodizing time is cut down so that the amount of anodizing that is done between measurements is reduced. This 4-to-1 ratio has been found to be optimum for these purposes, as illustrated in FIG. 4e.

If the anodize current were not slowed down at the very end, as in FIG. 4e, it would be possible to anodize the resistor $R_x$ beyond its desired value in between measurements. The waveform of FIG. 4f shows the actual transient into the amplifier K of the bridge circuit of FIG. 1. This transient current is the result of the anodize cycle and has several different parts. When the anodizing first starts, there is a first transient produced. While all of the distributed capacitance C on the resistor $R_x$ charges, the current from the anodize control circuit flows into the detector giving erroneous values during this part of the cycle. This transient continues until the end of the anodize cycle at which the normal anodize current value is probably attained. At about this time, anodizing switches off and a further transient of opposite polarity is thereby produced. This transient has to discharge the capacitance C which may be charged to several hundred volts. The slow mode has accordingly increased the settling time to let this transient decay as far as possible before the measuring interval, just at the end of the cycle.

If the cycle has completely discharged adequately, a measurement is made and the anodizing will be started or stopped, depending upon the outcome of the measurement. If the transient has not fully discharged, the direction of the transient will be such as to indicate to the bridge that it has reached final value. This, of course, would be a premature signal and would result in shut-down without anodizing. Such a condition is shown in waveform FIG. 4g, where a cycle has been missed. The settling time is now effectively two whole cycles long as it skips anodizing; with remeasurement occurring after two cycles. If such measurement indicates that indeed the resistor $R_x$ is not at final value, the slow mode will come back on again. This will now proceed at every other cycle (or, if necessary, every third, fourth or whatever cycle is required) in order to take care of the transient discharge of the distributed capacitance C. In general, this counting-down mode only occurs in practice at the last cycle or two of the anodizing process.

Figure 5:
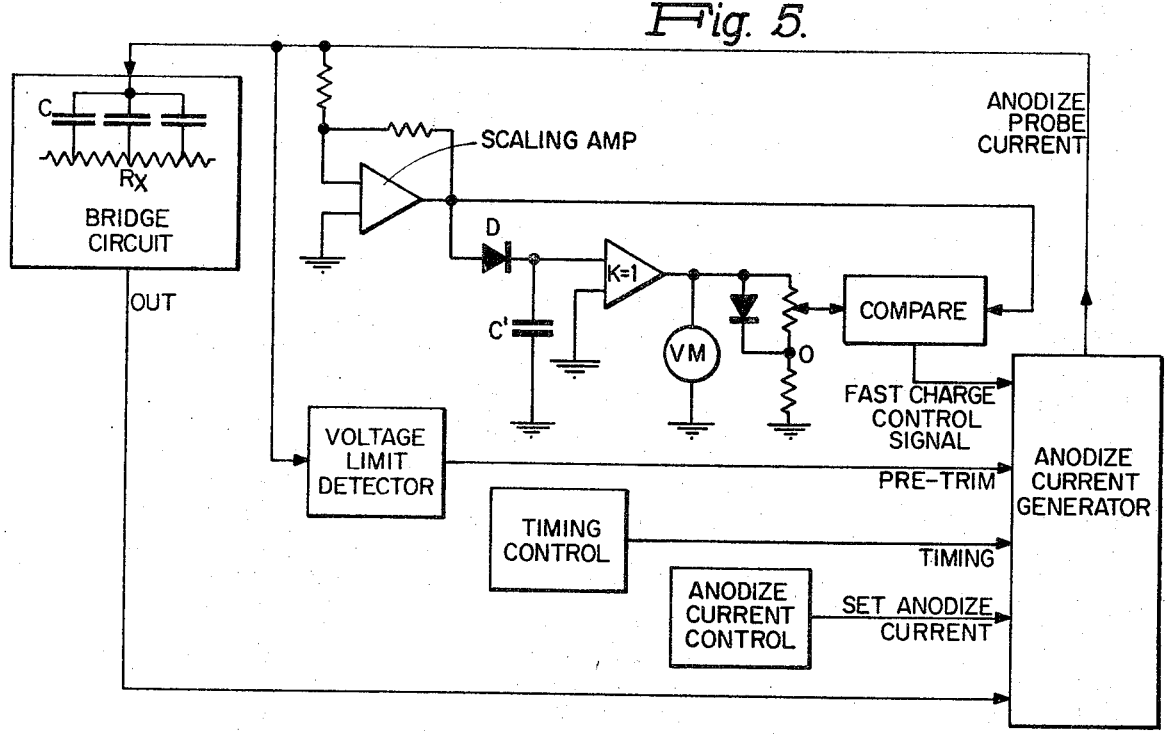

It is now in order to discuss the details of the embodiment of FIG. 5, illustrating a preferred form of the basic control circuit which is actuated by the bridge circuit to effect the anodizing of the unknown resistor in accordance with the above-described method underlying the invention.

When a resistor $R_x$ is first connected to the anodizer, before any measurements are made or any anodizing in a normal sense is done, it is often desired to build a minimum protective film on the resistor. Since the film thickness can be measured by measuring its breakdown voltage, circuits are provided to measure the voltage on the anodized probe while the current is flowing from the anodize current generator; and then to continue the anodizing until a predetermined voltage limit has been reached. At this point, the voltage limit detector shuts down the anodize current generator. This is the so-called pre-trim cycle which is used strictly to build a minimum film on the resistor, if such a film is desired. At the end of this pre-trim cycle, the normal bridge measuring-anodizing process takes over. The current which is used to do the anodizing is set by the anodize current control. This is a manual control or, in a computer control system later discussed, may be a programmed digital-to-analog converter that sets the current level of the anodize current generator. Timing control signals which are fed to the current generator, set the main time reference shown in FIG. 4. This sets the time frame at which the measurement intervals occur and determines the 20 and 80 percent parts of the cycle.

The voltage on the anodize probe (arrow, FIGS. 1 and 5) is scaled to a more convenient lower value, typically 0 to 5 volts on the output of a "scaling" amplifier, so-labelled, and it is measured by a peak detector shown as a diode D and capacitor C'. This capacitor C' is charged to the peak value and remains at this value, effectively storing the same for use as follows:

As each cycle progresses, the scaling amplifier automatically feeds a "compare" circuit with the instantaneous value on the probe, while the stored value from the previous cycle is fed in through the amplifier K with a gain of unity. In this way, the voltage level of the present cycle is compared to that of the previous cycle, and if it is less, it automatically actuates the fast charge control to increase the current in the anodize current generator to its maximum value. This causes the charging of the distributed capacitance C as fast as possible until the scaling amplifier indicates that the same value as the previous cycle has been reached.

Rather than use this fast charge control signal to charge all the way to the previous value, a small offset O is provided so that the circuits charge almost to the previous cycle, and then shut down. This is done because it has been found that if the charging occurs all the way, there is a possibility of anodizing proceeding at a faster rate than may be desired. Any offset from zero to the full value can be used, depending on the optimum desired.

These same principles have been applied to computer controlled systems where the greater flexibility provided by the computer allows the ultimate in processing speed. In this case, many resistors can be probed simultaneously. Systems probing over 400 resistors at a time have been constructed.

Figure 6:
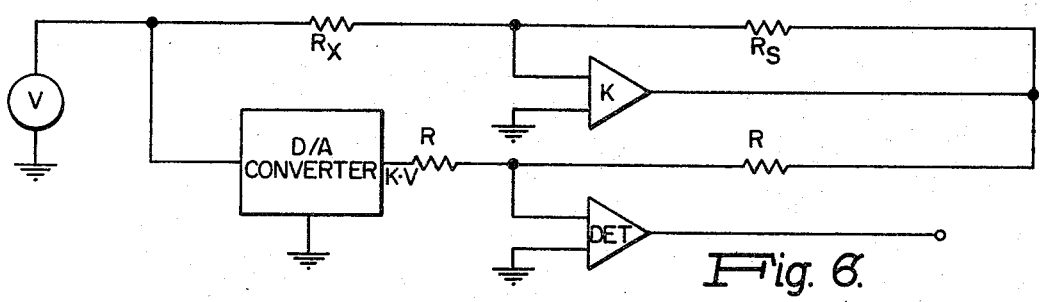

FIG. 6 shows a bridge similar to that shown in FIG. 1 in which the ratio arms contain a digital-to-analog converter D/A so that the bridge can be programmed at high speed from a digital computer. In this circuit the indicated value of K is proportional to I/R. If a computer is being used to control the operation, not only must the bridge values be altered, but the currents must be programmed in the anodize current generator. The anodize current control of FIG. 5, therefore, would also contain a digital-to-analog converter and be programmed by the computer, as would the voltage limit detector be similarly programmed. The timing control then contains an oscillator whose frequency is programmed by the computer so that the main time frame shown in FIG. 4 can also be set to optimum value.

If a computer is thusly used with the system, it is now possible to operate the same components in a somewhat more efficient manner in that the anodize current can be set to higher values during the initial fast-trim mode, so that the anodizing of the resistor $R_x$ can proceed at very high rates. In general, there is some upper rate at which the processing can proceed without seriously interfering with the stability of the final resistor. The computer would normally proceed at this maximum rate until it is so close to balance that one or two more cycles at this rate would take it over value. At this point, the computer can switch to a lower current and proceed at a rate which is now determined by the final accuracy requirement, such that the resistor, which may still be anodized in the so-called fast anodize mode, will not overshoot its value; and then, as the last of the cycles are reached, the system would switch back to the slow mode, previously described, where the settling time is increased and the anodizing is only about 20 percent of the cycle, FIG. 4g.

Another advantage of the computer control of FIG. 6 is that the currents can be altered during the cycle at fairly high speed under control of the computer, so that the computer can sense how the resistor is progressing and when certain points are reached, it can alter the bridge and anodizer.

In a computer controlled system, the first pre-trim cycle in which an oxide film of some minimum thickness is produced is usually applied to all resistors simultaneously. From information about the resistor width, film resistivity, resistance, desired accuracy and maximum desired anodization rate (i.e., volts per second of oxide film build up), the computer calculates the programs that desired current for the fast-trim mode. This mode continues at the maximum allowed anodizing rate until the final value is approached so closely that one or two more anodize cycles would take the resistor over value. At this point, the computer calculates a new fast-trim mode current which is reduced from the initial value so that it will not change the resistance value by more than approximately two times the accuracy band on each anodize cycle. When the resistor is brought within one or two anodize cycles of the desired value, the slow-trim mode is initiated, which increases the settling time in the same manner as the manual system previously described. In this mode, the 4-to-1 reduction in anodize rate now moves the resistor by one-half the accuracy band on each cycle, thus being able to stop the anodizing well within the required accuracy band.

As before, if insufficient settling time was allowed for the final measurements, the same circuits automatically drop anodize cycles as required to bring the resistor to value.

In a typical system, using the PDP8 computer of Digital Equipment Corporation, very high anodizing rates have been obtained. Since the computer can monitor more than one system at a time, twelve bridge circuits have been used similar to that shown in FIG. 6, controlled by the computer and measuring twelve different resistors simultaneously. Similarly, twelve anodize current generators, similar to that shown in FIG. 5, were employed in which the anodize current control, the timing control and voltage limit detector were all programmable from two digital-to-analog converters. The computer automatically determined the change-over point for all the fast-slow mode transitions and proceeded to anodize all twelve resistors to value, shutting each one down as it reached final value, to enable the system then to process many more resistors.

An electronic scanner composed of many switches was used automatically to switch the bridges from the twelve resistors just completed to the next twelve resistors to be processed. In this manner, up to 450 resistors have been processed on a single substrate by merely so switching them in groups of twelve. A typical anodize time for such a resistor is of the order of 10 seconds; and a system of this kind, processing twelve resistors in parallel, can actually have a throughput which is better than 1 resistor per second. This system is known as General Radio Resistance Anodize Trim System and reference is herein made to the manual being published substantially concurrently with the filing of this application, describing further details of the said operation.

Accuracies up to a few hundredths of a percent can be obtained in either manual or computer controlled systems embodying the invention.

While all of the circuit details and features of each of the embodiments of FIGS. 1 through 3, 5 and 6 are not shown in all of the figures, it is to be understood that the same may be incorporated in each figure.

Further modifications will also occur to those skilled in this art, and all such are considered to fall within the spirit and scope of the invention as defined in the appended claims.

What is claimed is:

1. A thin film resistor anodizing apparatus having, in combination, a bridge circuit containing as arms the resistor-to-be-anodized and standard and ratio-arm-resistances, with the said resistor being continuously connected between a grounded voltage source and a virtual ground terminal provided by operational amplifier means connected to provide feedback across said standard resistance; means for supplying anodizing current to said resistor to vary its value; means responsive to the bridge measuring current for comparing the values of said resistor and said standard resistance; means for cyclically and alternately applying said anodizing current from said supplying means to said resistor and monitoring the comparing means, with the cycle being proportioned to apply anodizing current during a period that is most of the cycle, for rapid trimming of the resistor, and to provide circuit settling and monitoring of the comparing means during a period that is a minor portion of said cycle, for determining whether the value of the resistor has reached the predetermined by the standard resistance; and means operable when the resistor value approaches that determined by the standard resistance for reducing the period of applied anodizing current to a minor portion of the said cycle, for slow trimming while permitting increasing the settling period.

2. A thin film resistor anodizing apparatus as claimed in claim 1 and in which the ratios of anodizing-to-settling periods are adjustable between substantially 4-to-1 during said rapid trimming cycle to substantially 1-to-4 during said slow trim cycle.

3. A thin film resistor anodizing apparatus as claimed in claim 1 and in which means is provided, responsive to the degree of discharge of the inherent thin-film-resistor capacitance, following its charging during anodizing, as the resistor approaches closely to said predetermined value, for maintaining the anodizing current applying means ineffective during at least one cycle to enable a longer period of settling to discharge said capacitance.

4. A thin film resistor anodizing apparatus as claimed in claim 3 and in which said resistor and standard resistance are connected as a four-terminal bridge circuit.

5. A thin film resistor anodizing apparatus as claimed in claim 4 and in which two-terminal guard means comprising shunt resistive paths is provided across said voltage source.

6. A thin film resistor anodizing apparatus as claimed in claim 3 and in which computer means comprising digital-to-analog converter means is provided for program-controlling the cyclical anodizing and the current thereof and the ratio of anodizing-to-settling periods.

7. A thin film resistor anodizing apparatus as claimed in claim 3 and in which said comparing means comprises means for storing the anodizing voltage each cycle and for comparing the same with the present cycle anodizing voltage.

8. A thin film resistor anodizing apparatus as claimed in claim 3 and in which means is provided, prior to said rapid and slow trimming operation, for pre-trimming said resistor to a predetermined minimum film value.

9. A thin film resistor anodizing apparatus as claimed in claim 8 and in which said pre-trimming means comprises voltage limit detector means connected between an anodizing probe at said resistor and anodize current generator means controlling the voltage at said probe.

* * * * *